No. 12,606. REISSUED FEB. 12, 1907.
R. J. NICHOLSON.
BOOKBINDER.
APPLICATION FILED JULY 11, 1906.
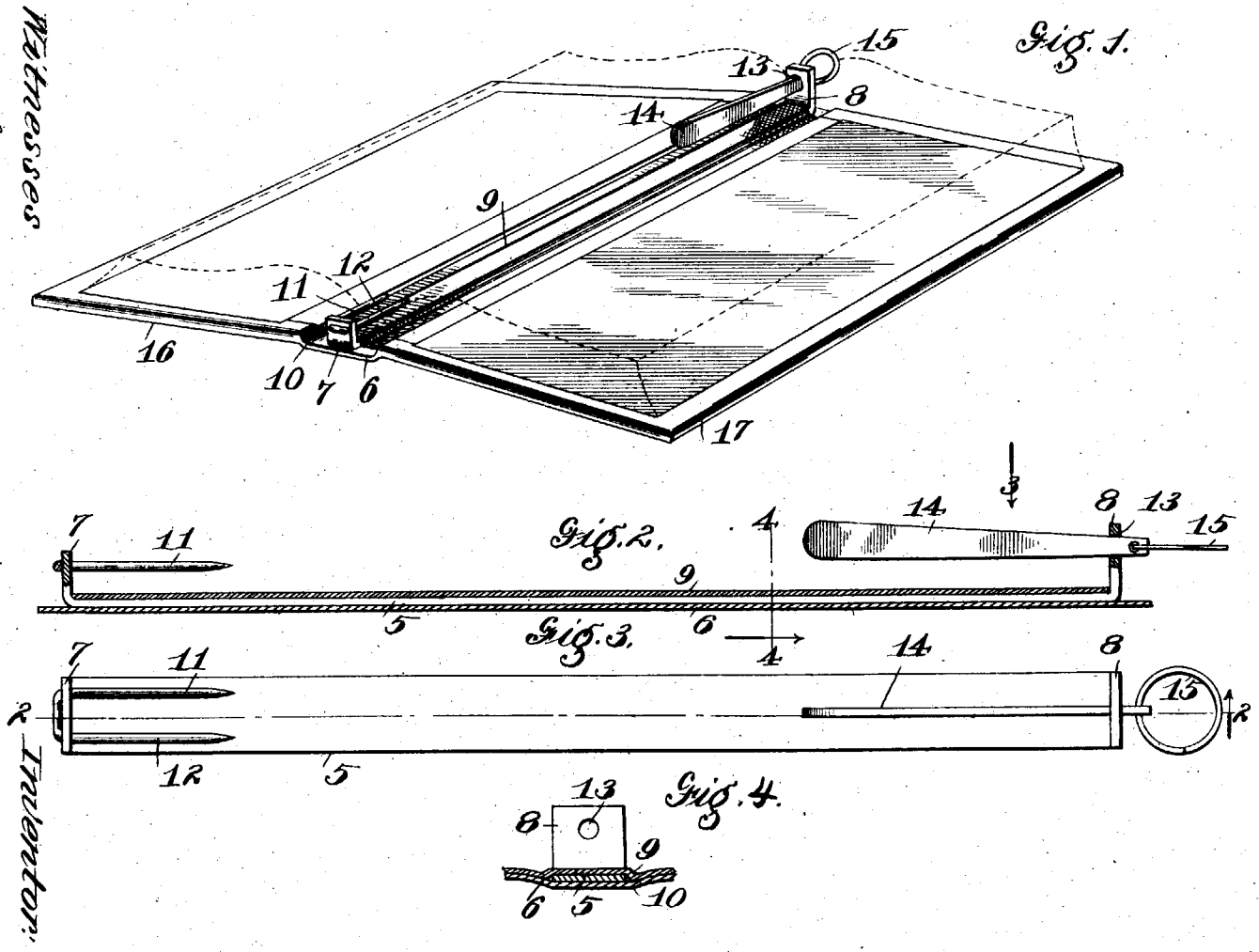
Witnesses
G. A. Paubenschmidt
Walt G. Krauser.
Inventor:
Robert J. Nicholson,
By G. L. Craig Atty
THE NORRIS PETERS CO., WASHINGTON, D. C.

UNITED STATES PATENT OFFICE.

ROBERT J. NICHOLSON, OF CHICAGO, ILLINOIS.

BOOKBINDER.

No. 12,606. Specification of Reissued Letters Patent. Reissued Feb. 12, 1907.

Original No. 800,475, dated September 26, 1905. Application for reissue filed July 11, 1906. Serial No. 325,742.

*To all whom it may concern:*

Be it known that I, ROBERT J. NICHOLSON, a citizen of the United States, residing at Chicago, in the county of Cook and State of Illinois, have invented a certain new and useful Improvement in Bookbinders, of which the following is a full, clear, concise, and exact description, reference being had to the accompanying drawings, forming a part of this specification.

My invention relates to improvements in bookbinders; and it consists of the novel features herein shown, described, and claimed.

In the drawings, Figure 1 is a perspective of a bookbinder embodying the principles of my invention, the book being shown in dotted lines. Fig. 2 is a sectional detail through the back of the binder and taken in the line 2 2 of Fig. 3. Fig. 3 is a top plan view of the binder removed from the back and covers and taken looking in the direction indicated by the arrow 3 in Fig. 2. Fig. 4 is a cross-section on the line 4 4 of Fig. 2 and looking in the direction indicated by the arrow, the clamp being removed.

Referring to the drawings in detail, the attaching-plate 5 is a flat strip of metal adapted to reach from one end of the back 6 to the other, and the ends of the attaching-plate are turned upwardly to form the arms 7 and 8, the said arms being in position to engage the end faces of the book to be bound. The attaching-plate 5 is secured between the upper section 9 and the lower section 10 of the back 6. A staple is inserted through the arm 7 to form the prongs 11 and 12 parallel with the plate 5, said staple being soldered or otherwise held rigidly in place. An opening 13 is formed through the arm 8, and a wedge-shaped clamp 14 is inserted outwardly through the opening 13. A key-ring 15 is inserted through the outer end of the clamp 14.

When it is desired to apply the covers 16 and 17 to a book, the ring 15 is removed. Then the clamp 14 is removed and the book is placed between the arms 7 and 8, with the prongs 11 and 12 passing between the leaves of the book. Then the book is opened approximately at the center and the clamp 14 placed down in the center of the book and inserted through the opening 13 and the key-ring 15 inserted through the clamp.

My bookbinder is intended for telephone-books and the like and for all kinds of books which it is desired to bind. The ring 15 may be used in hanging the book upon the wall or suitable support.

The clamp 14 is tightened up in the opening 13 by virtue of its wedge shape, and when so tightened is rigid relative to the attaching-plate.

I claim—

1. In combination with a pair of covers, connected by a back, of an attaching-plate, secured to the back, arms extending upwardly from the ends of the attaching-plate; a staple, forming prongs, extending from one arm and adapted to engage between the leaves of the book; and a wedge-shaped clamp having its wider end extending inwardly to be inserted between the leaves of the book, and having its outer end projected through an opening in the other arm.

2. In a bookbinder, an attaching-plate; arms extending upwardly from the ends of the attaching-plate, there being an opening through one arm; a staple forming prongs extending from the other arm and adapted to engage between the leaves of a book; a wedge-shaped clamp adapted to be inserted wide end first between the leaves of the book and having its narrow portion located loosely in said opening, and a ring removably inserted through the outer end of said wedge-shaped clamp.

3. A device of the class described comprising an element adapted to engage the back of a book and elements for insertion between leaves thereof, the element that is adapted to engage the back of the book being provided with an upwardly-extending arm having an opening therein for the passage of one of the elements that is adapted for interposition between the leaves of the book, said latter element being reduced in size, the larger end of the latter element being disposable between the leaves of the book and serving to engage the arm to permit the projection of the smaller end outwardly to a limited extent only, and a fastening device for holding the said latter element in place after it has been projected through said arm.

4. A device of the class described comprising an element adapted to engage the back of a book and elements for insertion between leaves thereof, the element that is adapted to engage the back of the book being provided with an upwardly-extending arm having an opening therein for the passage of one of the elements that is adapted for interposition between the leaves of the book, said latter element being wedge-shaped, whereby the smaller end thereof may project through the arm outwardly to a limited extent, and a fastening device for securing the said latter element in its position with respect to the arm.

5. A device of the class described comprising an element adapted to engage the back of a book and elements for insertion between leaves thereof, the element that is adapted to engage the back of the book being provided with an upwardly-extending arm having an opening therein for the passage of one of the elements that is adapted for interposition between the leaves of the book, said latter element being so shaped at one end as to permit its projection outwardly to a limited extent only, and a fastening device for holding the said latter element in place after it has been projected through said arm.

In witness whereof I hereunto subscribe my name this 28th day of June, A. D. 1906.

ROBERT J. NICHOLSON.

Witnesses:
G. L. CRAGG,
WEBB G. KRAUSER.